Feb. 7, 1939.  G. RAYMOND  2,146,092
VALVE
Filed May 11, 1936   3 Sheets-Sheet 1

Fig. 1-A.

INVENTOR
Gwynne Raymond.
BY
ATTORNEY

Feb. 7, 1939.  G. RAYMOND  2,146,092
VALVE
Filed May 11, 1936   3 Sheets-Sheet 2
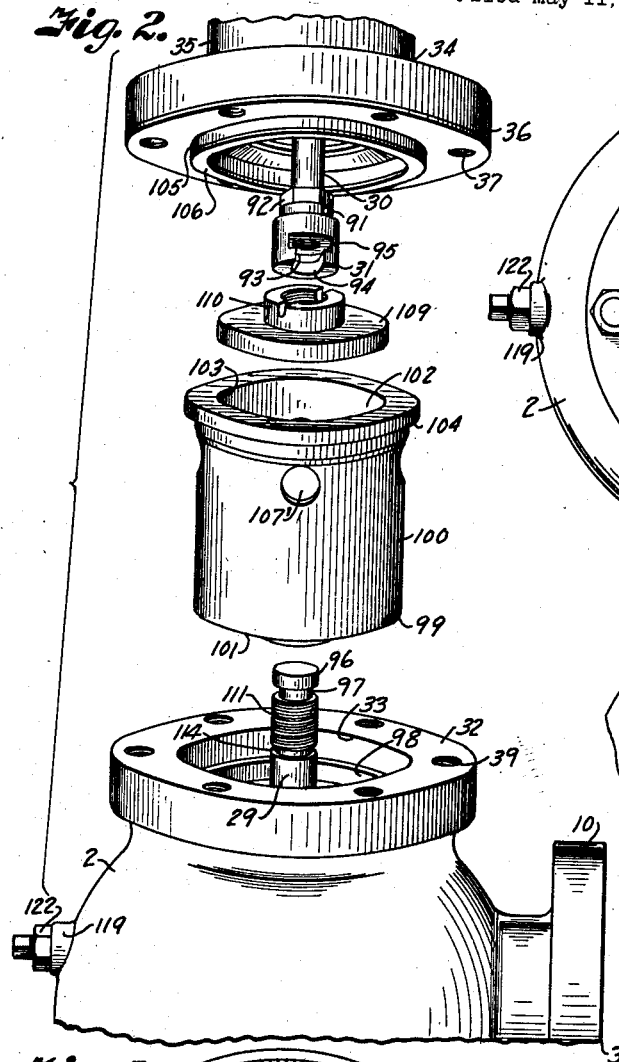
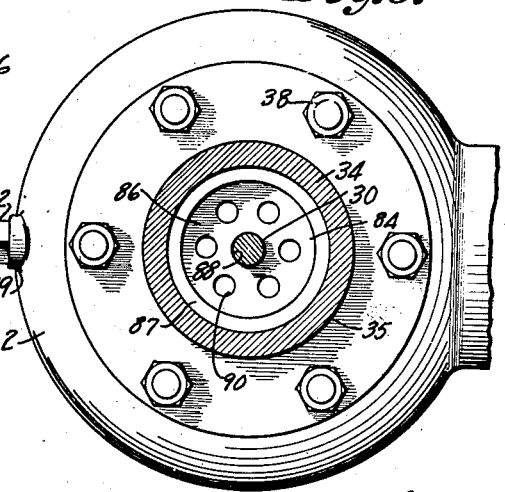
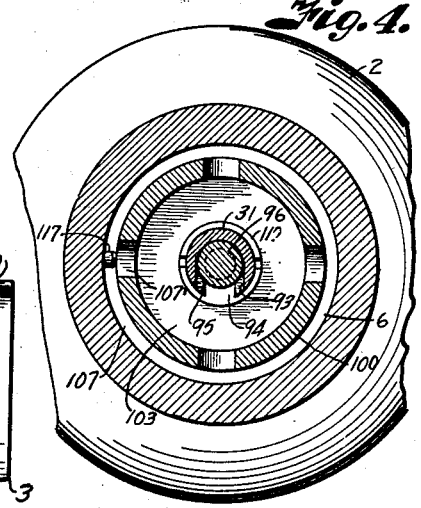
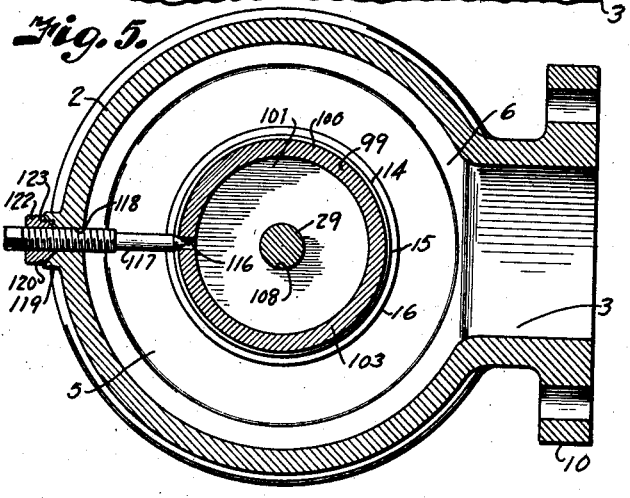
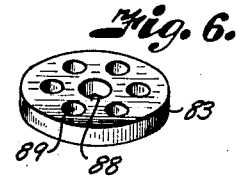
INVENTOR
Gwynne Raymond.
BY
ATTORNEY

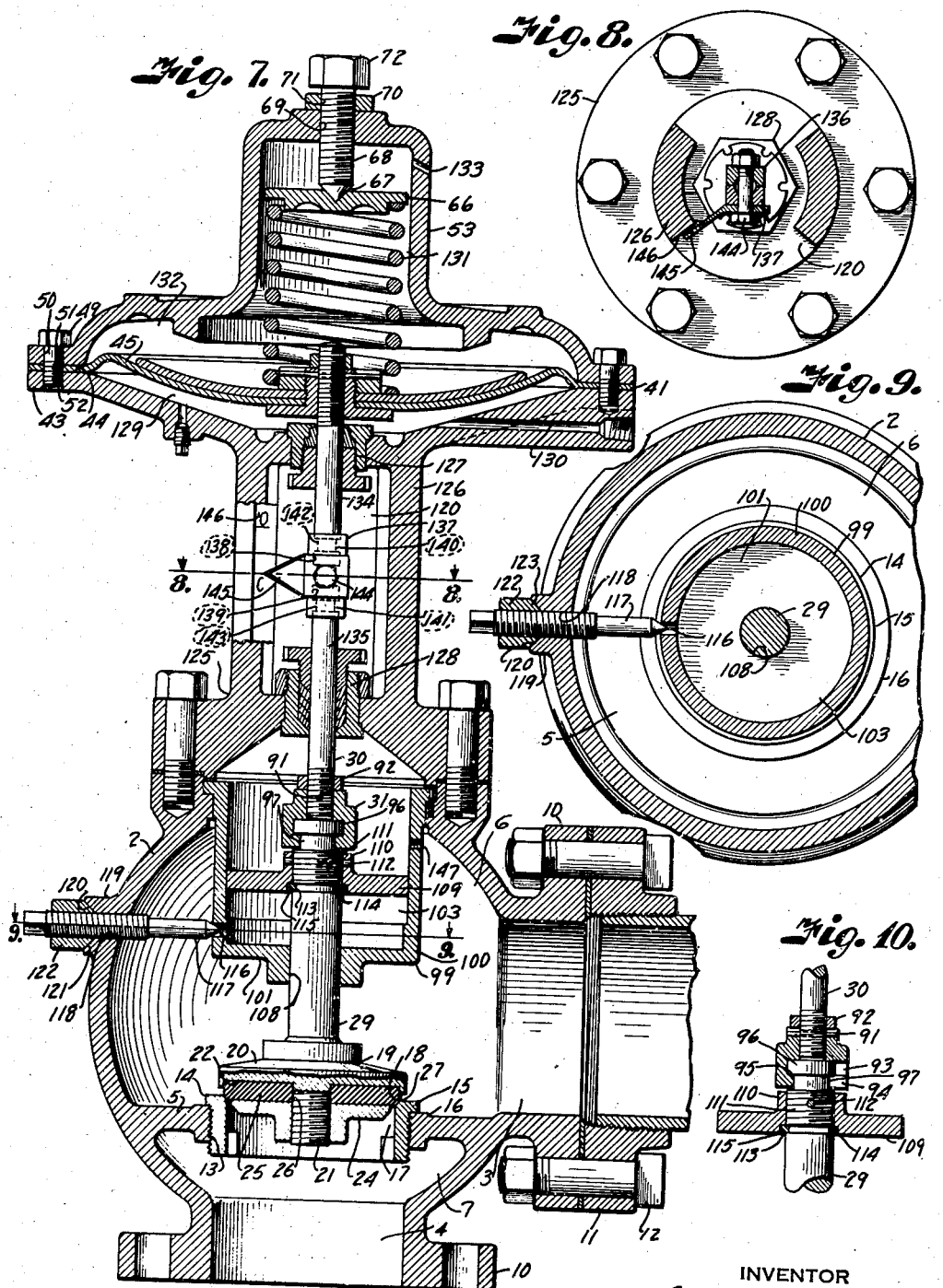

Patented Feb. 7, 1939

2,146,092

UNITED STATES PATENT OFFICE 2,146,092

VALVE

Gwynne Raymond, Oklahoma City, Okla.

Application May 11, 1936, Serial No. 79,057

9 Claims. (Cl. 137—153)

This invention relates to valves, and particularly to those actuated or controlled by motive power such as a pressure actuated diaphragm. Valves of this character are prone to chatter when operating with comparatively low pressures for the reason that the diaphragm is slow to respond to lagging pressures.

It is, therefore, the principal object of the present invention to provide a valve of this character with means to prevent chattering of the valving member while the pressure differentials are becoming sufficiently positive to actuate the valve.

Other important objects of the invention are to provide a valve of this character with cushioning means that is incorporated in the internal parts of the valve; to provide means for selectively adjusting the cushioning mechanism; to regulate the effect thereof on the valving member; and to provide for opening and closing the valving member responsive to variation in hydrostatic pressures of fluid moving through the valve.

It is a further object of the invention to provide a valve of this character with a pilot control for operating the valve independently of the hydrostatic head of fluid moving through the valve.

Another object of the invention is to provide a valve wherein the valving member and seat, as well as the cushioning mechanism, may be constructed of materials not affected by the corrosive action of the fluid passed through the valve.

In accomplishing these and other objects of the invention, I have provided improved details of structure, the preferred forms of which are illustrated in the accompanying drawings, wherein:

Fig. 1 is a vertical section through a diaphragm actuated valve embodying the features of the present invention, the valve being constructed so that the hydrostatic head of fluid to be passed through the valve is utilized in opening and closing the valving member.

Fig. 1—A shows an adaptation of the valve for controlling flow of fluid from a liquid and gas separator.

Fig. 2 is a fragmentary view of the upper portion of the valve body, the lower portion of the valve bonnet and the parts of the cushioning mechanism shown in disassembled, spaced relation.

Fig. 3 is a horizontal section through the valve bonnet on the line 3—3 of Fig. 1.

Fig. 4 is a horizontal section through the valve body on the line 4—4, Fig. 1.

Fig. 5 is a horizontal section through the valve body on the line 5—5 of Fig. 1.

Fig. 6 is a perspective view of one of the dashpot cover plates.

Fig. 7 is a vertical section through a modified form of valve wherein the valve member is actuated responsive to an external motivating force.

Fig. 8 is a horizontal section through the valve bonnet of the modified valve on the line 8—8 of Fig. 7.

Fig. 9 is a horizontal section through the modified form of valve on the line 9—9 of Fig. 7.

Fig. 10 is a detail section through the check piston and valve stem assembly, the valve stem sections being shown in elevation.

Referring more in detail to the drawings:

1 designates a valve constructed in accordance with the present invention and which includes a valve body 2 which may be of substantially globular shape, and provided with inlet and outlet connections 3 and 4 on opposite sides of a partition 5 which divides the interior of the valve body into inlet and outlet chambers 6 and 7 respectively.

Figure 1:
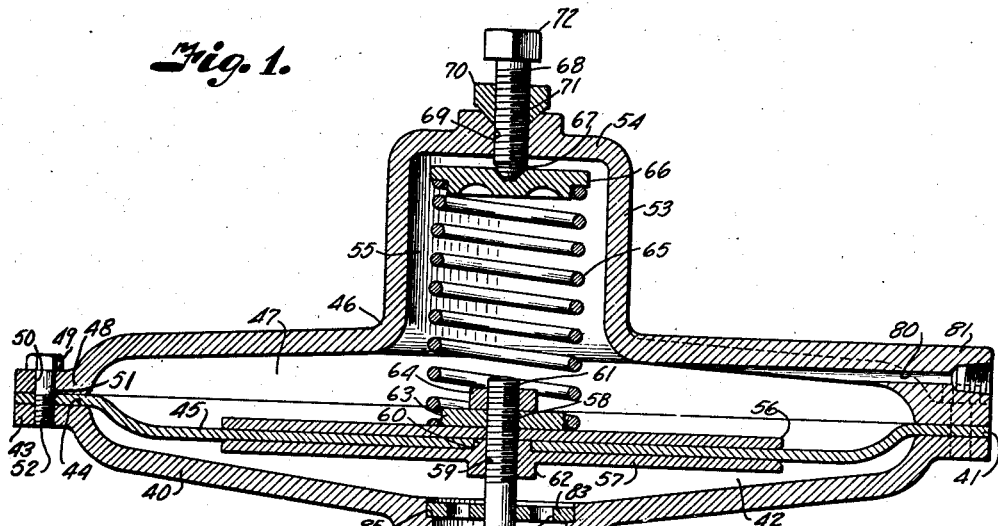
Figure 1:
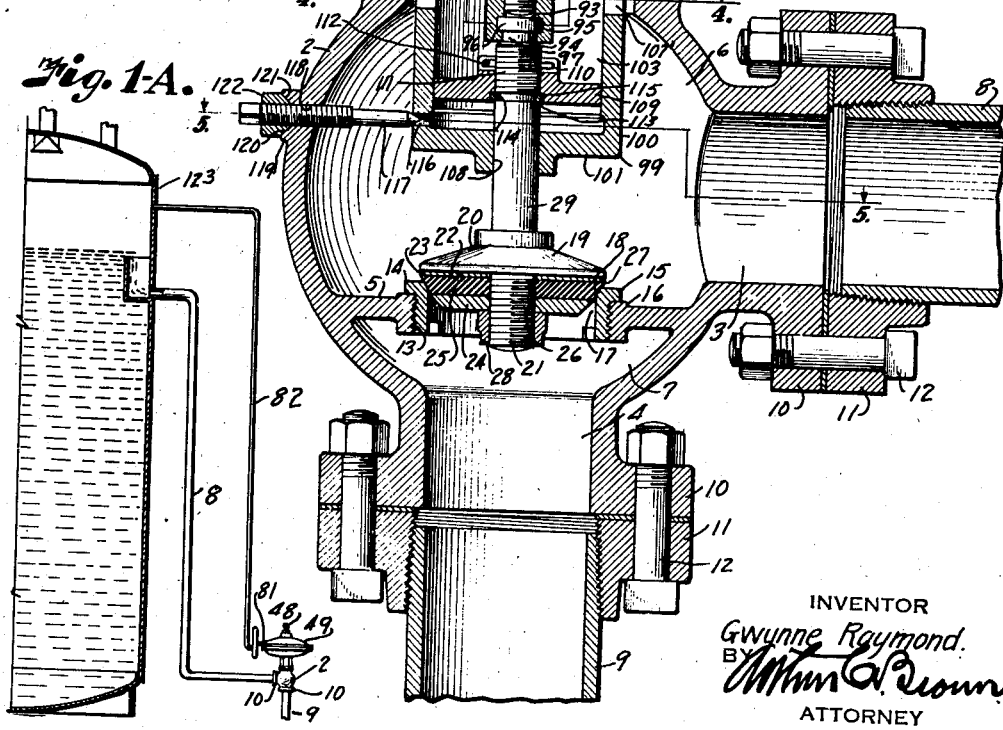

The inlet and outlet connections 3 and 4 may be of any suitable type to connect with inlet and discharge lines 8 and 9, but in the illustrated instance they are shown as provided with flanges 10 that are secured to flange collars 11 on the respective line sections by bolts 12 extending through the respective flanges, as best shown in Fig. 1.

The partition 5 is provided with an internally threaded opening 13 for mounting a valve seat ring 14 that is threaded therein, and has an annular flange 15 engaging against an annular boss 16 formed as a part of the partition 5. The seat ring 14 thus provides a valve port 17 through which fluid flows from the inlet to the outlet sides of the valve, and which is provided with a bevelled seat 18 for seating a valving member 19.

The valving member 19 includes a mushroom-shaped head 20 of slightly larger diameter than the valve seat and has a threaded shank 21 projecting into the valve port 17. The head 20 has a flat face 22 encircling the shank 21 to seat a washer 23 that is inserted over the shank 21, and cooperates with a clamping washer 24 to secure a valve disk 25 having a central opening 26 snugly engaging over the shank 21 and a bevelled outer face 27 engaging the bevelled seat 18 of the ring 14. The valve disk is preferably formed of one of the phenolic resins known as Bakelite, as such material is not subject to the corrosive action of most oily fluids and has sufficient resilience so that a seating ring may be used which is of hard metal, for example nickel steel. The washers and seating ring are clampingly retained against the head 20 by a nut 28 that is threaded onto the shank 21, shown in Fig. 1.

Formed axially with the head 20 is a stem section 29 that is connected with a diaphragm stem 30 by means of a coupling 31, later described. Formed on the valve body, concentric with the valve stem, is a bonnet seating flange 32 encircling an opening 33 that is of larger diameter than the diameter of the valving member to permit insertion thereof into the valve body. Mounted on the flange 32 is a valve bonnet 34 comprising a cylindrical neck 35 having a radially extending flange 36 provided with openings 37 through which fastening devices, such as bolts 38, are projected into internally threaded sockets 39 formed in the seating face of the flange 32 to secure the valve bonnet on the valve body.

Formed on the opposite end of the neck 35 is one section 40 of a diaphragm housing 41. The section 40 is of concavo-convex shape to provide a pressure chamber 42 and terminates at its periphery in a lateral, annular flange 43, having a flat, upper face 44 to seat the peripheral edge of a flexible diaphragm 45. Mounted on the diaphragm, in cooperative relation with the lower housing section, is an upper housing section 46 conforming in shape to the lower housing section to provide a chamber 47 on that side of the diaphragm. The section 46 has a peripheral flange 48 cooperating with the flange 43 to clampingly secure the sections together by means of fastening devices, such as cap screws 49, extending through aligning openings 50 and 51 in the flange 48 and diaphragm 45 respectively, and into threaded sockets 52.

Projecting axially from the wall of the housing section 46 is a hollow, cylindrical extension 53 closed by an end wall 54 to form a spring socket 55 opening into the chamber 47. The diaphragm 45 is backed on the respective sides thereof by means of plates 56 and 57 having openings 58 and 59 aligning with a central opening 60 in the diaphragm to pass a threaded end 61 of the diaphragm stem 30. The opening 59 is formed in a hub portion 62 of the plate 57 and is internally threaded to engage the stem 30. The hub portion 62 is reduced on the face of the plate engaging the diaphragm to project through the diaphragm opening 58 into seating contact with the plate 56.

Sleeved over the projecting end of the stem 30 is a washerd 63 that is engaged by a nut 64 threaded on the stem and cooperating with the threaded hub portion of the lower plate to clamp the plates to the diaphragm. The diaphragm 45 is normally urged into position for seating the valve member by means of a coil spring 65 having one end engaging the plate 56 and its opposite end carrying a cap 66 that is engaged by the cone-shaped end 67 of an adjusting screw 68, the adjusting screw being threadedly mounted in an opening 69 of the spring socket and retained in adjusted position by a jamb nut 70. The jamb nut 70 preferably has a cone-shaped portion 71 to seat within a cone-shaped socket encircling the threaded opening 69 to provide a fluid-tight joint about the threads. The adjusting screw projects outwardly from the housing and carries a polygonal-shaped head 72 by which it may be rotated to effect adjustment of the spring 65.

When the valve is used in connection with vessels operating under varying pressures it is necessary to balance the pressures on the opposite sides of the diaphragm in order that opening movement of the valve is responsive only to hydrostatic head of fluid acting on the under side of the diaphragm. When the gas pressures acting on the diaphragm and on the liquid are balanced, the valve can be set to operate at a definite, predetermined hydrostatic pressure regardless of any variation in the gas pressure. I, therefore, provide the chamber 47 with a port 80 that is located in a boss 81, formed on the upper face of the diaphragm housing section 46, and which has its outer end counter-bored and threaded to connect a pipe 82 which conducts the pressure medium acting on the hydrostatic head of liquid in the pipe 8.

The diaphagm stem 30 is guidingly supported for reciprocation through the chamber that is formed within the neck 35 by means of upper and lower cover plates 83 and 84. The cover plates are supported on shoulders 85 and 86 inset from the ends of the cylindrical chamber 87. The center of the plates are provided with suitable openings 88 to slidably pass the diaphragm stem and retain it in concentric relation with the valve stem 29. The cover plates are further provided with circular series of openings 89 and 90 to pass fluid from the interior of the valve body to the diaphragm chamber 42 to act on the diaphragm and effect an opening of the valve, as later described.

The coupling 31 is preferably threaded on the free end of the diaphragm stem, and is secured against rotation by a cotter pin 91 extending through the coupling and an aligning opening in the stem. The coupling is further secured to the stem by means of a lock nut 92 threaded on the stem and engaging against the collar. The collar has a recess 93 in its opposite end opening from a side thereof, and which aligns with a notched opening 94 of smaller size than the recess to form a shoulder 95.

The upper end of the valve stem has a cylindrical head portion 96 to engage within the recess 93, and has an annular groove 97 to engage in the notch 94 and thereby couple the valve stem to the diaphragm stem so that when the diaphragm is actuated the valve member is moved a corresponding distance to and from its seat. When the valve is operated with comparatively low pressure fluids the valving member tends to chatter for the reason that the diaphragm is slow to respond to the differential forces tending to move the diaphragm and those tending to hold the valve closed, and in order to prevent this effect, I provide the movable parts of the valve with an internal cushioning mechanism, as now to be described.

Formed within the opening 33 at a point spaced below the seating face of the flange 32 is an annular rib 98 extending inwardly therefrom to mount a dash-pot 99. The dash-pot includes a cylindrical wall 100 having a closed end 101 facing the valving member and an open end 102 facing the lower cover plate 84 to form a piston chamber 103. The dash-pot is provided with an annular rim 104 for seating on the rib 98 and which is retained thereagainst by means of an annular rib 105 formed as a part of the valve bonnet and engaging against a gasket ring 106 seated on the rim 104. The portion of the dashpot which extends past the annular rib conforms to the inner diameter of the rib, but the remaining portion thereof is reduced in size to provide an annular passage 107 between the dash-pot and the valve body so that fluid can pass from the valve body through radial ports 107' in the side wall of the dash-pot to the interior thereof, and through the ports 90 and 89 into the chamber 42 to act on the diaphragm in response to the hydrostatic pressure of the fluid in the inlet section of the line.

The valve stem 29 is reciprocably mounted in an opening 108 in the end 101 of the dash-pot, and carries a piston 109 snugly fitting the inner surface of the dash-pot chamber. The piston 109 includes a hub portion 110 that is threadedly engaged with a threaded portion 111 of the valve stem and is secured against rotation thereon by means of a cotter pin 112 extending through notches in the hub and through an opening in the stem. The piston is retained in desired spaced relation relatively to the bottom of the dash-pot chamber by means of a split washer 113 that is seated in a groove 114 formed in the valve stem adjacent the terminus of the threads 111, and has its periphery projecting from the stem to seat in a counter-bore 115 formed in the bottom face of the piston.

Fluid is drawn into the dash-pot chamber below the piston through a port 116 that is controlled by a needle valve 117 threadedly mounted in an opening 118 formed in the side wall of the valve body in alignment with the port 116. The opening 118 is formed in a boss 119 having a cone-shaped recess 120 to be engaged by the cone portion 121 of a jamb nut 122 that is threaded on the threaded portion of the needle valve to prevent rotation thereof after it has been selectively adjusted to effectively vary the port area. The outer end of the needle valve is provided with a flattened portion whereby it may be readily rotated to effect adjustment thereof.

In using a valve, for example, on the liquid outlet line of an oil and gas separator 123, a valve is selected having the proper sized diaphragm area as compared to the area of the valving member, for it is primarily these areas which control the working periods of the valve and the amount of liquid passed therethrough at each operation, as now to be described.

After selecting the valve having the proper sized diaphragm area for the work in hand, the valve is connected to the line 8 at a sufficient level below the connection of the line with the separator so that the line will contain a column of liquid having a hydrostatic head sufficient to operate the valve. The line 82 is then connected with the gas space at the top of the separator, as shown in Fig. 1—A, so that the gas pressure on the respective sides of the diaphragm are in balance.

With the valve connected as described, surplus liquid flowing from the separator empties into the line 8 but is stopped by the valve since the valve is normally held closed incidental to its weight and action of the spring 65 on the diaphragm. As the level of the liquid rises in the pipe 8, liquid flows through the ports 107' to fill the dash-pot cylinder and to act against the diaphragm through the ports in the cover plates 84 and 83. However, the valve will remain seated until the hydrostatic level of the fluid in the line 8 becomes high enough so that the effective head pressure, acting on the under side of the diaphragm, overbalancing the pressure acting against the valving member, plus the power of the spring 65 and the friction of the valve parts. Movement of the valve in response to the diaphragm is, however, resisted incidental to the rate at which fluid can be drawn through the port 116 into the dash-pot cylinder, and opening of the valve is retarded until the hydrostatic pressure becomes sufficiently positive to assure movement of the valve in response to the pressure acting on the lower side of the diaphragm and in opposition to the forces acting to retain the valve closed. When this occurs the valve is moved away from its seat, causing the piston 109 to draw fluid through the port 116 of the check chamber as set by the needle valve 117.

By adjusting the needle valve to vary the effective area of the port 116, the rate at which fluid may be drawn into the check chamber is controlled so that the opening rate of the valve may be regulated to the desired degree and thereby prevent any tendency of the valve to chatter. The fluid is then free to flow from the pipe 8, through the valve seat, and out through the pipe 9.

When sufficient fluid has flowed from the pipe 8 to drop the hydrostatic head so that the head pressure acting on the under side of the diaphragm becomes less than the power of the spring 65, the valve will be moved toward seated position as governed by the rate at which the checking liquid can be forced by the piston 109 through the valve port 116. This checking movement of the valve allows time for liquid to flow from the line 8, and prevents tendency of the valve to pound against its seat. After the valve is seated and other liquid flows from the separator into the line 8, the hydrostatic head will again build up to act on the valve in the same manner as above described, to effect intermittent automatic flow of the liquid, under control of the valve.

In the form of the invention shown in Figs. 7 to 10 inclusive, the valve body and dash-pot mechanism correspond exactly to the similar parts in the preferred form of the invention, and the numerals designating these parts are used in connection with the same parts in the modified form of the invention. The valve bonnet 125, however, is of different construction, and has a cylindrical neck 126 of longer length than the cylindrical neck 34 of the valve bonnet previously described, and has oppositely arranged diametrical openings 120 to permit manipulation of the packing boxes 127 and 128 that are mounted within the opposite ends of the neck to close off the open end of the dash-pot cylinder and the bottom end of the lower diaphragm chamber 129, respectively. In this instance, the lower diaphragm chamber 129 is provided with a channel 130 through which a pressure fluid may be admitted to the chamber 129 for actuating the diaphragm against action of its loading spring 131 to effect opening of the valving member, the upper chamber 132 of the diaphragm housing being open to atmosphere through a port 133.

The diaphragm stem is formed of two sections 134 and 135 that are connected by a pair of coupling bosses 136 and 137 that are provided with longitudinal grooves 138 and 139 conforming to the outer diameter of the stem sections and which have inwardly extending ribs 140 and 141 to engage in grooves 142 and 143 in the stem sections. The blocks are retained in coupling engagement with the stem sections by means of a bolt 144 extending therethrough between the spaced ends of the rod, as shown in Fig. 7. Also carried by the bolt 144 is a pointer 145 that is movable over a scale 146 that is formed in the cylindrical neck at one side of one of the openings 120 to indicate the open and closed positions of the valve.

In order to equalize the pressures acting on the upper side of the check piston, the check cylinder is provided with a port 147 that communicates with the interior of the valve body so that valve pressures are admitted to the check chamber on the upper side of the piston. In a valve of this type, the valve remains closed as long as the spring pressure, plus the resistance of the movable parts, preponderates over the pressure in the diaphragm chamber 129. However, when the pressure medium is admitted thereto the forces acting on the diaphragm overcome the spring action, plus the pressure acting on the upper surface of the valving member, to cause opening movement of the valve. However, the valve can move to open position only when the motive pressure has become sufficiently effective to cause immediate opening thereof under control of the check piston which can move upwardly only as fast as fluid may be drawn therein under the control port 116, thereby preventing the valve from chattering, in the same manner as in the valve described in connection with the first form of the invention.

When the supply of pressure medium to the chamber 129 is cut off, the spring, acting on the upper side of the diaphragm, again becomes effective to close the valve, however, closing movement of the valve in response to spring pressure is dependent upon the rate at which fluid is forced from the check chamber by downward movement of the check piston to prevent its sudden closing of the valve.

From the foregoing, it is apparent that I have provided a simple and inexpensive valve structure, wherein a cushioning mechanism is incorporated into and forms a part of the internal valve mechanism, and which effectively prevents chattering which is detrimental to the valving member as well as its seat. The cushioning mechanism also provides an accurate control of the opening and closing movements of the valve to prevent detrimental effects caused by sudden opening or closing thereof.

What I claim and desire to secure by Letters Patent is:

1. A valve including a valve body having inlet and outlet connections for flow of fluid through the valve body and having a valve seat, a valving member for said seat, a dash-pot supported within the the valve body, a piston in the dash-pot, means connecting the piston with the valving member, a valve bonnet carried by the valve body, a diaphragm housing on the valve bonnet, a diaphragm in the diaphragm housing, a stem operably connecting the diaphragm with the piston, guide plates in the valve bonnet for guiding said stem and having apertures therein for passing fluid from the valve body to the diaphragm housing for actuating the diaphragm, and means for admitting fluid to the dash-pot for checking action of the piston responsive to movement of the diaphragm.

2. A valve including a valve body, a valving member in the valve body for controlling flow of liquid through the valve when said liquid is under pressure of a gaseous medium, a diaphragm supported by the valve body and operable responsive to hydrostatic pressure of the liquid acting against one side of said diaphragm, means connecting the diaphragm with the valving member, cushioning means in said connecting means for controlling movement of the valving member responsive to movement of the diaphragm, a spring engaging the diaphragm to seat the valving member, means for admitting the gaseous medium to the valve body to act upon the opposite side of the diaphragm, and means for regulating the cushioning effect of said cushioning means.

3. A valve for controlling flow of liquid subject to varying pressure of an elastic fluid and responsive to hydrostatic head of the liquid including a valve body having an inlet adapted for connection with said head of liquid and having an outlet, a valving member in the valve body for controlling flow of liquid through the valve, means providing a diaphragm chamber having connection with the inlet side of the valve body, a diaphragm in said chamber having one side subject to the hydrostatic head of liquid on the inlet side of the valve to effect movement of the diaphragm to valve opening position, means connecting the diaphragm with the valving member, means connected with the diaphragm chamber on the opposite side of said diaphragm for transmitting varying pressure of elastic fluid to the diaphragm whereby the effect of the elastic fluid acting on the head of liquid is substantially balanced so that the diaphragm is responsive to the hydrostatic head of said liquid to open the valve, and means for checking opening movement of the valving member including means for timing closing of the valving member when the hydrostatic head of liquid drops to a predetermined level.

4. A valve for controlling flow of liquid subject to varying pressure of an elastic fluid and responsive to hydrostatic head of the liquid including a valve body having an inlet adapted for connection with said head of liquid and having an outlet, a valving member in the valve body for controlling flow of liquid through the valve, means providing a diaphragm chamber having connection with the inlet side of the valve body, a diaphragm in said chamber having one side subject to the hydrostatic head of liquid on the inlet side of the valve to effect movement of the diaphragm to valve opening position, means connecting the diaphragm with the valving member, means connected with the diaphragm chamber on the opposite side of said diaphragm for transmitting said varying pressure of elastic fluid to the diaphragm whereby the effect of the elastic fluid acting on the head of liquid is substantially balanced so that the diaphragm is responsive to the hydrostatic head of said liquid to open the valve, means for checking opening movement of the valving member including means for timing closing of the valving member when the hydrostatic head of liquid drops to a predetermined level, and a spring normally urging the valve to closed position.

5. A valve for controlling flow of liquid subject to varying pressure of an elastic fluid and responsive to hydrostatic head of the liquid including a valve body having an inlet adapted for connection with said head of liquid and having an outlet, a valving member in the valve body for controlling flow of liquid through the valve, means providing a diaphragm chamber having connection with the inlet side of the valve body, a diaphragm in said chamber having one side subject to the hydrostatic head of liquid on the inlet side of the valve to effect movement of the diaphragm to valve opening position, means connecting the diaphragm with the valving member, means connected with the diaphragm chamber on the opposite side of said diaphragm for transmitting said varying pressure of elastic fluid to the diaphragm whereby the effect of the elastic fluid acting on the head of liquid is substantially balanced so that the diaphragm is responsive to the hydrostatic head of said liquid to open the valving member, a check chamber supported between the diaphragm and the valving member and having a port connected with the inlet side of the valve, and a piston slidable in the check chamber and connected with said connecting means to draw liquid into the check chamber through said port when the valving member is moved to open position responsive to a predetermined hydrostatic head of liquid and to expel said indrawn liquid upon closing of the valving member when the hydrostatic head drops to a predetermined level for timing the opening and closing period of the valving member.

6. A valve for controlling flow of liquid subject to varying pressure of an elastic fluid and responsive to hydrostatic head of the liquid including a valve body having an inlet adapted for connection with said head of liquid and having an outlet, a valving member in the valve body for controlling flow of liquid through the valve, means providing a diaphragm chamber having connection with the inlet side of the valve body, a diaphragm in said chamber having one side subject to the hydrostatic head of liquid on the inlet side of the valve to effect movement of the diaphragm to valve opening position, means connecting the diaphragm with the valving member, means connected with the diaphragm chamber on the opposite side of said diaphragm for transmitting varying pressure of elastic fluid to the diaphragm whereby the effect of the elastic fluid acting on the head of liquid is substantially balanced so that the diaphragm is responsive to the hydrostatic head of said liquid to open the valving member, a check chamber supported between the diaphragm and the valving member and having a port connected with the inlet side of the valve, a piston slidable in the check chamber and connected with said connecting means to draw liquid into the check chamber through said port when the valving member is moved to open position responsive to a predetermined hydrostatic head of liquid and to expel said indrawn liquid upon closing of the valving member when the hydrostatic head drops to a predetermined level for timing the opening and closing period of the valving member, and means selectively regulating the effective area of said port.

7. A valve including a valve body having inlet and outlet connections and a valve seat interposed between said connections, a valving member for said seat to control flow of liquid from the inlet to the outlet connection, a dash-pot supported in the valve body and having a port directly connecting the dash-pot with the inlet connection for inlet and outlet of a portion of the fluid passed through the valve, a piston in the dash-pot, means connecting the piston with the valving member, means for actuating the valving member responsive to hydrostatic head of the liquid on said inlet side of the valve, and a valve for controlling the effective area of said inlet and outlet port and having an operating stem extending through to the exterior of the valve body for regulating the checking effect of the piston under action of said valving member actuating means.

8. A valve including a valve body having inlet and outlet connections for flow of liquid through the valve body and having a valve seat, a valving member for said seat to control flow of liquid from the inlet to the outlet connection, a dash-pot suspended within the valve body, a piston in the dash-pot, means connecting the piston with the valving member, a valve bonnet carried by the valve body, a diaphragm housing on the valve bonnet having direct connection with the valve inlet, a diaphragm in the diaphragm housing responsive to hydrostatic head of liquid on said inlet side of the valve, a stem connecting the diaphragm with the piston, and means for admitting a portion of said liquid to the dash-pot for checking action of the piston responsive to movement of the diaphragm.

9. A valve including a valve body having inlet and outlet connections and a valve seat interposed between said connections, a valving member for said seat to control flow of liquid through the valve when under pressure of a gaseous medium, pressure actuated means on the inlet side of the valving member for opening the valving member responsive to a predetermined head of said liquid, means connecting the valving member with the pressure actuated means, a dash-pot supported in the valve body between the pressure actuated means and the valving member and having a port for inlet and outlet of a portion of said liquid passed through the valve, a piston in the dash-pot and inserted in said connecting means for movement with the valving member to draw liquid through said port into the dash-pot and to discharge the liquid through said port incidental to opening and closing of the valve responsive to said pressure actuated means, means admitting said gaseous medium to the valve for acting upon the pressure actuated means whereby the valve is movable responsive only to said predetermined head, and a valving member controlling the effective area of said port to time opening and closing movements of the valve.

GWYNNE RAYMOND.